United States Patent [19]

Suzuki

[11] Patent Number: 5,309,418
[45] Date of Patent: May 3, 1994

[54] TRACK COUNTING DEVICE USING A PLL

[75] Inventor: Haruyuki Suzuki, Yokohama, Japan

[73] Assignee: Ricoh Company, Ltd., Tokyo, Japan

[21] Appl. No.: 823,983

[22] Filed: Jan. 22, 1992

[30] Foreign Application Priority Data

Jan. 31, 1991 [JP] Japan .................................. 3-029134

[51] Int. Cl.$^5$ .............................................. G11B 7/00
[52] U.S. Cl. ............................. 369/44.28; 360/78.14; 369/54
[58] Field of Search ............... 360/78.11, 78.14, 78.04; 369/44.28, 32, 53, 54

[56] References Cited

U.S. PATENT DOCUMENTS

| | | | |
|---|---|---|---|
| 4,527,145 | 7/1985 | Haussmann et al. | 358/19 |
| 5,034,940 | 7/1991 | Saito et al. | 369/44.34 |
| 5,050,146 | 9/1991 | Richgels | 369/44.28 X |
| 5,128,916 | 7/1992 | Ito et al. | 369/44.28 X |

OTHER PUBLICATIONS

Lathi "Modern Digital and Analog Communication Systems" 1989, pp. 81-82, 322-325; 346-350.
Kazuhisa Koumura, et al., "High Speed Accessing by Direct Accessing" Proceedings of the International Symposium on Optical Memory, Japanese Journal of Applied Physics, vol. 28 (1989) Supplement. 28-3, pp. 73-76.

*Primary Examiner*—Aristotelis Psitos
*Assistant Examiner*—James T. Wilson
*Attorney, Agent, or Firm*—Cooper & Dunham

[57] ABSTRACT

A track counting device receives a tracking error signal from a light pickup element which is moving over a record medium having recording tracks thereon. A wave shaping circuit shapes the tracking error signal into a signal of rectangular pulses. A phase-locked loop (PLL) circuit receives the signal and compares it with a signal created by itself so as to synchronize a phase between two signals. The PLL circuit constantly effects the comparison to obtain the synchronized signal, so that it may provide information about the number of tracks crossed by the light pickup element apart from influence of surface conditions on the record medium such as a mirror finished surface and pits. A counter counts the number of tracks based on the synchronized signal.

1 Claim, 7 Drawing Sheets

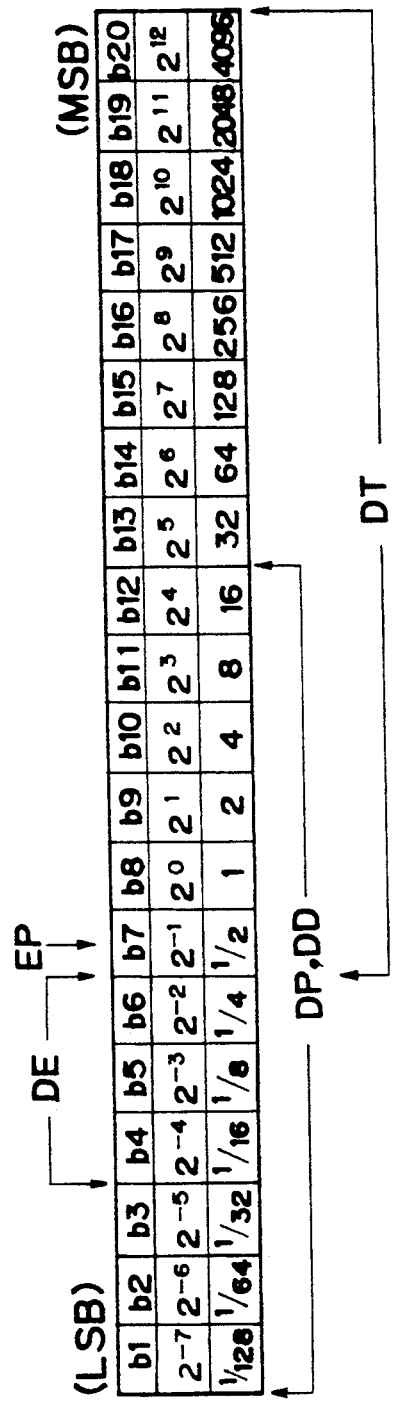

18

TRACK COUNTING DEVICE USING A PLL

BACKGROUND OF THE INVENTION

1. Field of the Invention

The present invention relates to a track counting device for counting the number of recording tracks on a record medium of optical disk apparatus. More particularly, the invention relates to a track counting device which counts the number of recording tracks crossed by a light pickup element, which is radially moving over a record medium with concentric guide grooves of recording tracks, based on a tracking error signal output from the light pickup unit.

2. Description of the Related Art

An example of optical disk apparatus is a direct read after write optical disk apparatus using a record medium on which concentric guide grooves of recording tracks are formed. In such an optical disk apparatus, a light pickup element radially moves over the record medium for record and reproduction of data thereof and generates a tracking error signal. The optical disk apparatus then counts the number of recording tracks which have been crossed by the light pickup element, based on the tracking error signal output from the light pickup element. A conventional example of such track counting device is shown in FIG. 7.

In FIG. 7, a tracking error signal Et (cf. (a) in FIG. 8) output from an unrepresented light pickup element is shaped by a wave shaping circuit 1 with respect to the zero level. The thus obtained signal Ec (cf. (b) in FIG. 8) is then led to a counter 2.

The counter 2 counts the number of rise edges of the signal Ec. The count number is sent to a downward element as a crossed track data Ct (cf. (c) in FIG. 8) representing the number of recording tracks which have been crossed by the light pickup element.

In the above constitution, the tracking error signal Et is so sinusoidal that the maximum amplitude is gained at a side edge of guide groove of recording track during the recording track crossing of light pickup element. The period of the sinusoidal signal corresponds to a time necessary for crossing one recording track.

The signal Ec takes the logic level H when the tracking error signal Et surpasses the zero level accordingly, whereby one rise edge appears for one recording track in the signal Ec.

Consequently, the number of rise edges in the signal Ec coincides with the number of crossed recording tracks, while the count of counter 2 also with the latter. Hence the crossed track data Ct can provide the number of recording tracks which have been crossed by the light pickup element.

The conventional device has, however, the following problems.

The recording tracks are divided into a number of sectors of determined data length, each of which is given header information such as a sector address to discriminate one from others.

The header information data is preliminarily recorded in the recording track. Mirror finished portion not to record effective data are given between the header information and a user's data area in the sector in order to adjust properties of signal processing means of reproduction system.

When the light pickup element passes such a mirror finished portion the level of tracking error signal Et remains unchanged as shown as PA in (a) of FIG. 8.

This results in no appearance of rise edge in the signal Et, which in turn causes no count operation of the counter 2. Therefore, one of problems appears as noncoincidence between the value of crossed track data Ct and the number of actually crossed recording tracks.

Further, the recording of data in the record medium is effected by forming pits (small holes) therein. When a laser beam from the light pickup element crosses such a pit in the user's data recorded area, a reflection level of laser beam increases at the edge of pit due to the edge effect. Such influence on the tracking error signal Et is shown as PB in (a) of FIG. 8.

The signal Ec then has a rise edge at each point where the level of PB in Et exceeds the zero level, so that the counter 2 counts each of the rise edges. This also leads to noncoincidence between the crossed track data value Ct and the actually crossed recording track number.

SUMMARY OF THE INVENTION

It is therefore an object of the present invention to provide a track counting device which allows accurate detection of the number of recording tracks having actually been crossed, solving the above-described problems in the conventional devices.

The object of the invention can be achieved by a track counting device comprising a wave shaping circuit for shaping a tracking error signal, a phase-locked loop (PLL) circuit for generating a PLL signal and synchronizing in phase said PLL signal with the wave-shaped tracking error signal, and a counter for counting the number of tracks based on said synchronized PLL signal.

According to the present invention, the number of tracks is obtained not from the actually detected tracking error signal, but from the signal of the PLL circuit. Hence obtained is the proper number of recording tracks which the light pickup element has actually crossed, without influence of surface conditions on the record medium.

Further objects and advantages of the present invention will be apparent from the following description of the preferred embodiments of the invention as illustrated in the accompanying drawings.

BRIEF DESCRIPTION OF THE DRAWINGS

FIG. 3A is a drawing to illustrate a column position for each data;

FIG. 3B is a drawing to illustrate a column position for each data;

DESCRIPTION OF THE PREFERRED EMBODIMENTS

There are preferred embodiments of the present invention below explained with reference to the accompanying drawings.

Figure 1:
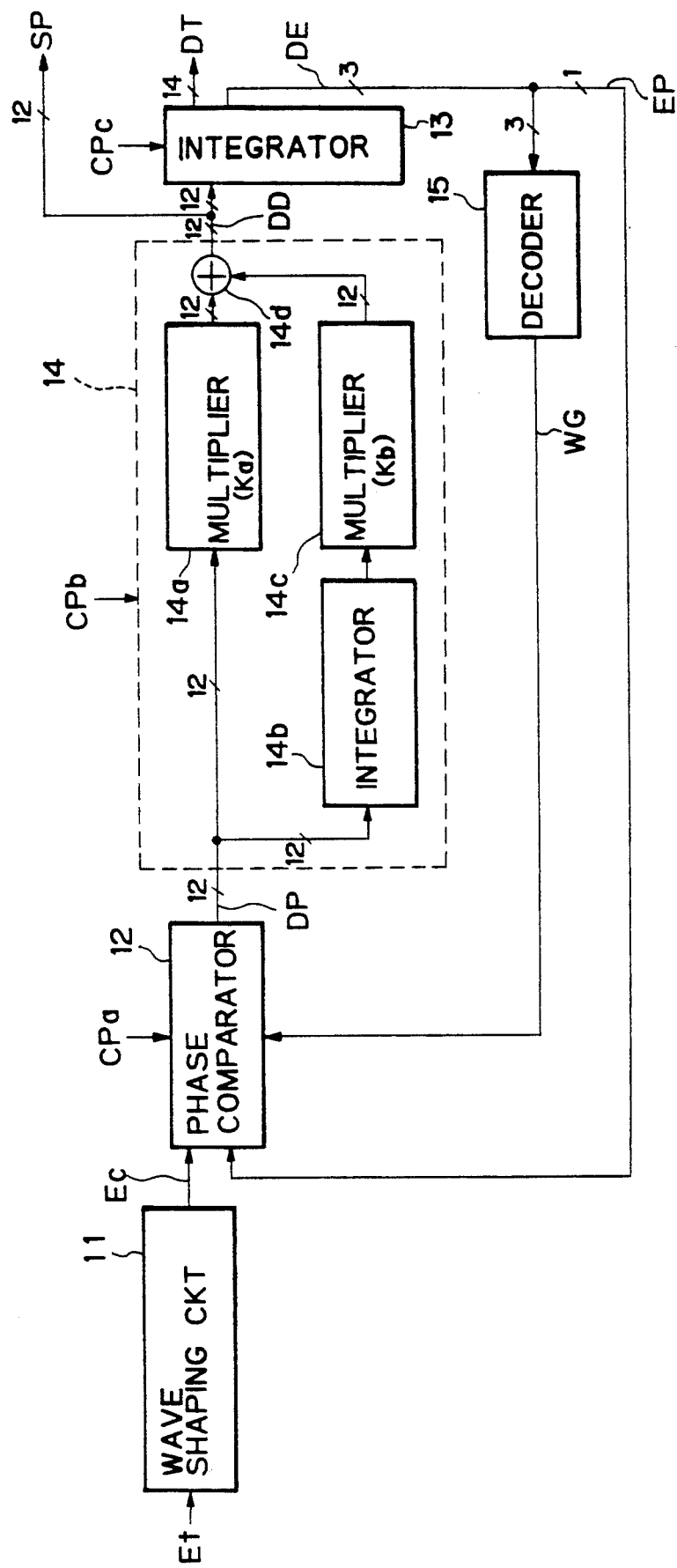
FIG. 1 is a block diagram to show a preferred embodiment of a track counting device according to the present invention.
Figure 7:
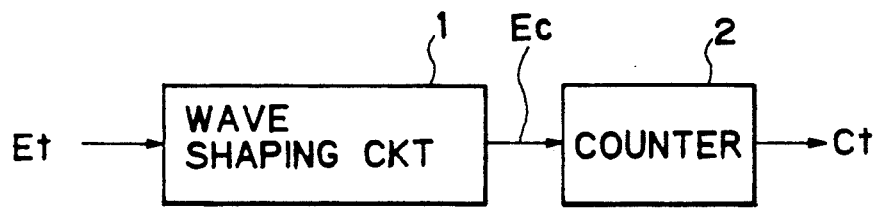
FIG. 7 is a block diagram to show an example of conventional track counting devices.
Figure 8:
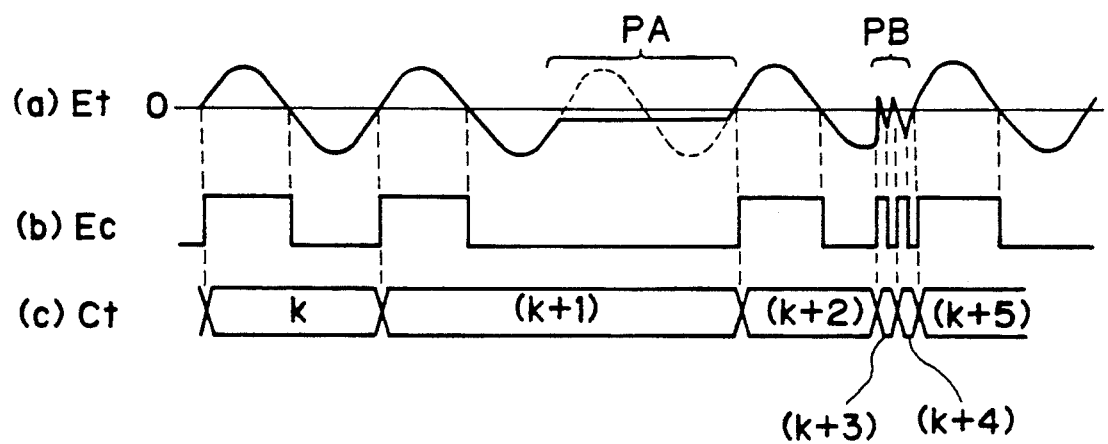
FIG. 8 is a drawing to illustrate operating wave shapes in the device as shown in FIG. 7.

FIG. 1 shows an embodiment of a track counting device according to the present invention. In FIG. 1, the same parts and corresponding parts in FIG. 7 are given the same referential numerals.

Figure 2:
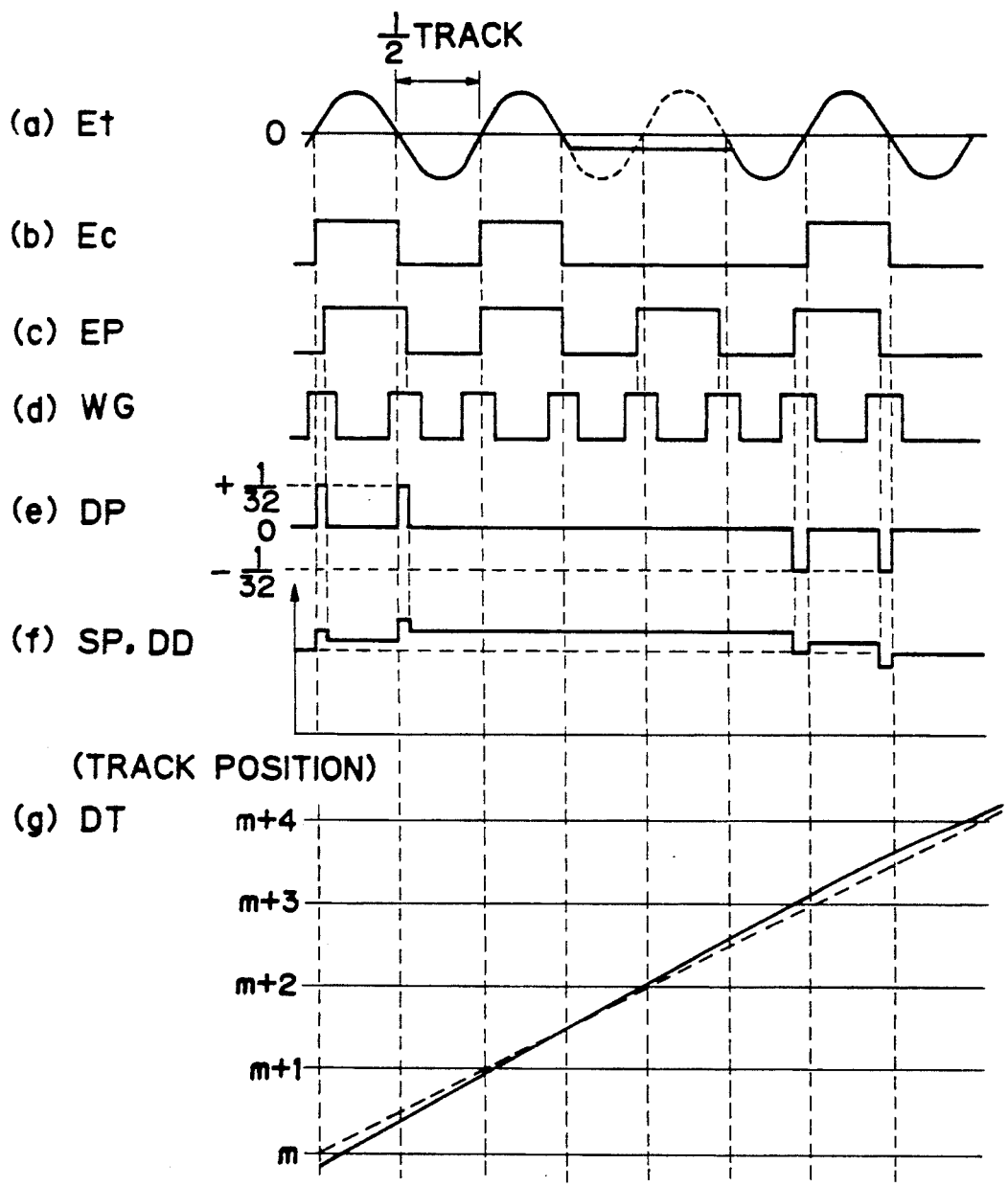
FIG. 2 is a drawing to illustrate operating wave shapes in the track counting device as shown in FIG. 1.

A tracking error signal Et (cf. (a) in FIG. 2) output from an unrepresented light pickup element is shaped by a wave shaping circuit 11 with respect to the zero level, and the thus obtained signal Ec (cf. (b) in FIG. 2) is sent to one of input terminals of a phase comparator 12.

The other input terminal of the phase comparator 12 is given a signal EP (cf. (c) in FIG. 2) output from an integrator 13. The phase comparator 12 compares the rise timing of signal EP with that of signal Ec and judges whether the signal EP is advanced or delayed with respect to the signal Ec, so that the comparator 12 produces phase comparison data DP (cf. (c) in FIG. 2) based on the judgement. The phase comparison data DP is applied to a digital filter 14. The phase comparator 12 is operated by means of a clock CPa of a predetermined period.

The digital filter 14 effects smoothing and integration of the phase comparison data DP, which comprises a multiplier 14a for multiplying the phase comparison data DP by a predetermined loop factor Ka, an integrator 14b for integrating the phase comparison data DP, another multiplier 14c for multiplying the integration result of the integrator 14b by another predetermined loop factor Kb, and an adder 14d for summing the operational results of the multipliers 14a, 14c. The data output DD from the adder 14d is applied to the integrator 13, and is also output to a downward element as a speed data SP (cf. (f) in FIG. 2) representing a moving speed of the light pickup element at the moment. The digital filter 14 is operated by means of a clock CPb of a predetermined period.

The integrator 13 performs the integration operation of the output data DD in synchronism with a clock CPc of a predetermined period. A part of the integration result is output to a downward element as a crossed track number data DT (cf. (g) in FIG. 2) representing the number of recording tracks which the light pickup element has crossed. Another part of the integration result of the integrator 13 is sent to a decoder 15 as data DE and a specific signal of one bit to the phase comparator 12 as a signal EP.

The phase comparator 12, the digital filter 14, the integrator 13, and the decoder 15 constitute a digital phase-locked loop (PLL) circuit for synchronizing the phase of signal EP with that of signal Ec.

The decoder 15 produces a gate signal WG for defining a timing of phase comparison of the phase comparator 12 based on the data DE, and sends the gate signal WG to the phase comparator 12.

The phase comparison data DP and the data DD are digital signals of 12 bits, the crossed track number data DT a digital signal of 14 bits, and the data DE a digital signal of 3 bits.

The integrator 13 has a data width of 20 bits, a bit b8 of which is set as a column to represent a record track unit, as shown in FIG. 3A. In this case, the phase comparison data DP and the data DD occupy columns of bits b1 to b12 of data input into the integrator 13, the data DE columns of bits b4 to b6 thereof, and the signal EP a column of bit b7. Similarly the bit number of the integrator 13 will hereinafter be used to refer to a column position in the respective signals or data. The phase or distance is expressed by a unit length of a recording track width.

Accordingly, the data DP,DD can take any value up to $\pm(32-(1/128))$ in unit of 1/128 recording track, the crossed track number data DT any value up to $\pm(8192-(\frac{1}{2}))$ in unit of $\frac{1}{2}$ recording track, and the data DE up to $\pm((\frac{1}{2})-(1/16))$ in unit of 1/16 recording track. Also the speed data SP takes the same value as the data DD, as described above, so that the speed data SP may have any value up to $\pm(32-(1/128))$ in unit of 1/128 recording track.

Therefore, the crossed track number data DT may provide information of a half recording track unit on the number of recording tracks which have been crossed by the light pickup element. Similarly the speed data SP may provide information of a 1/128 recording track unit on a distance where the light pickup element moves within a unit time.

The comparator 12 outputs the phase comparison data DP of a (1/32) recording track if the signal EP lags the signal Ec whereas it outputs the data DP of a $-(1/32)$ recording track if the signal EP leads the signal Ec, as seen in FIG. 3B. If the signals Ec and EP coincide with each other the comparator 12 outputs the phase comparison data DP representing a zero recording track.

Figures 4A, 4B:
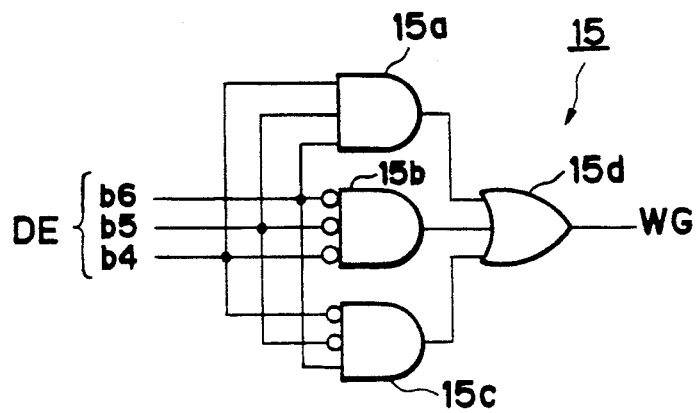
FIG. 4A is a block diagram of an example of a decoder.
FIG. 4B is a drawing to illustrate the operation of the decoder of FIG. 4A.

FIG. 4A shows an example of the decoder 15.

As seen in FIG. 4A, the data of bit b4 in the data DE is supplied to an input terminal of an AND circuit 15a, to an inverted input terminal of an AND circuit 15b, and to an input terminal of an AND circuit 15c.

The data of bit b5 in the data DE is supplied to another input terminal of the AND circuit 15a, to another inverted terminal of the AND circuit 15b, and to an inverted input terminal of the AND circuit 15c.

The data of bit b6 in the data DE is supplied to the other input terminal of the AND circuit 15a, to the other inverted input terminal of the AND circuit 15b, and to the other inverted input terminal of the AND circuit 15c.

The output signal of the AND circuit 15a takes the logic level H when the data DE is (111) (in the order of b4, b5, and b6, as will henceforth be used). The output signal of the AND circuit 15b takes the logic level H when the data DE is (000) and that of the AND circuit 15c when (100). The output signals from the AND circuits 15a, 15b, 15c are output to an OR circuit 15d, which outputs the gate signal WG.

According to this arrangement, the gate signal WG takes the logic level H while the light pickup element moves between respective 1/16 recording tracks before and after each recording track, and between respective 1/16 recording tracks before and after each half position of respective recording track, as shown in FIG. 4B.

Consequently, the comparison operation of the phase comparator 12 is effected whenever the light pickup element has moved by a radial distance of a $\frac{1}{2}$ recording track.

In case that the light pickup element approaches the recording track m, the gate signal WG changes into the logic level H at the position of a 1/16 recording track before the track m, and maintains the level H up to the position of a 1/16 recording track after the track m, so that the phase relation may be judged by the comparator 12 between the signals Ec and EP during the period of time of the logic level H (see FIG. 2).

If the speed data SP is lower than the actual moving speed of the light pickup element, that is, if the signal EP lags the signal Ec, the phase comparator 12 outputs the phase comparison data DP representing a 1/32 recording track to increase the data DD by a change corresponding to the value of the phase comparison data DP. The speed data SP also increases with the increase of the data DD.

The integration value of the integrator 13 increases at a rate of change equivalent to the data DD. Thus if the signal EP lags the signal Ec with respect to the phase, the integration value of the integrator increases at a greater rate of change than before the comparison, whereby the crossed track number data DT also changes faster as seen in FIG. 2.

Further supposing the signal EP leads the signal Ec in phase when the light pickup element reaches the recording track (m+3), the speed data SP exceeding the actual moving speed of the light pickup element, the phase comparator 12 outputs the phase comparison data DP representing a −(1/32) recording track to reduce the data DD by a change corresponding to the value of the phase comparison data DP. The speed data SP also decreases with the reduction of the data DD.

The integration value of the integrator 13 increases at a smaller rate of change than before the comparison in such a case that the signal EP leads the signal Ec in phase, whereby the crossed track number data DT varies slower.

Consequently, the crossed track number data DT changes to follow the number of recording tracks which the light pickup element has actually crossed. The speed data SP also changes to follow the actual moving speed of the light pickup element at the same time.

Moreover suppose the laser beam from the light pickup element crosses a mirror finished portion between the header information recorded area and the user's data area in the recording track (m+2), the tracking error signal Et remains unchanged and the signal Ec has no rise. The comparator 12 then performs no comparison operation to output the phase comparison data DP of no recording track.

This maintains the value of the data DD output from the digital filter 14, so that the integration value of the integrator 13 changes at the same rate of change as before. As a result, the crossed track number data DT changes approximately at the same change rate as the light pickup element crosses the recording track (m+2), whereby the data DT may be used to properly obtain the number of recording tracks which the light pickup element has crossed.

On the other hand, in case that the laser beam of the light pickup element crosses a record pit in the user's data area, causing a noise on the tracking error signal Et to result in an unwanted rise on the signal Ec, the comparator 12 does not effect the comparison without the logic level H of the gate signal WG. This also assures the proper integration of the integrator 13.

Above explained is the case that the light pickup element moves at a constant speed. There is another case below explained that the light pickup element starts moving from a stationary state.

The moving speed of the light pickup element becomes gradually increased starting zero.

The inner conditions of the above-mentioned phase-locked loop (PLL) circuit are initialized on starting the motion of the light pickup element, so that the gate signal WG from the decoder 15 is kept at the logic level H. Hence the comparator 12 carries out the phase comparison operation at a first rise edge of the signal Ec based on the tracking error signal Et which appears right after the motion of the light pickup element has started. At the start the lagged phase is to be judged to output a value of a (1/32) recording track as the phase comparison data DP.

Then the data DD output from the digital filter 14 increases from zero, while the integration value of the integrator 13 also does. The integration value of the integrator 13 may become greater as the light pickup element moves accordingly.

The phase comparator 12 again executes the phase comparison upon output of the gate signal WG when the light pickup element moved by a distance corresponding to a ½ recording track. Again at this comparison the lagged phase would be judged to increase the data DD from the digital filter 14, correcting the speed data SP towards the moving speed of the light pickup element.

In addition the integration value of the integrator 13 changes at a greater rate of change in respond to the increase in the moving speed of the light pickup element, so that the crossed track number data DT may properly stand for the number of recording tracks crossed by the light pickup element.

Similarly when the light pickup element is decelerated to stop, gradually decreasing its moving speed, the appropriate value of the crossed track number data DT may be obtained as well as the speed data SP responsive to the moving speed of the light pickup element.

As described above, the track counting device according to the present invention provides the proper crossed track number data DT without influence of surface conditions of record medium crossed by the laser beam of the light pickup element. The track counting device also provides the speed data SP representing the moving speed of the light pickup element, necessitating no means for detecting the moving speed of the light pickup element. This would contribute to minimizing the optical disk apparatus as well as to reducing its production cost.

Although the output value of the phase comparison data DP from the phase comparator 12 is set constant regardless of the phase difference between the signals Ec and EP in the above-described embodiment, the comparator 12 may be arranged to output a value of the phase comparison data DP varied responsive to the phase difference therebetween.

It should also be noted that the bit number of the integrator 13 may be equalized to those of the phase comparison data DP and of the internal data of the PLL circuit though it differs therefrom in the above embodiment.

Figure 5:
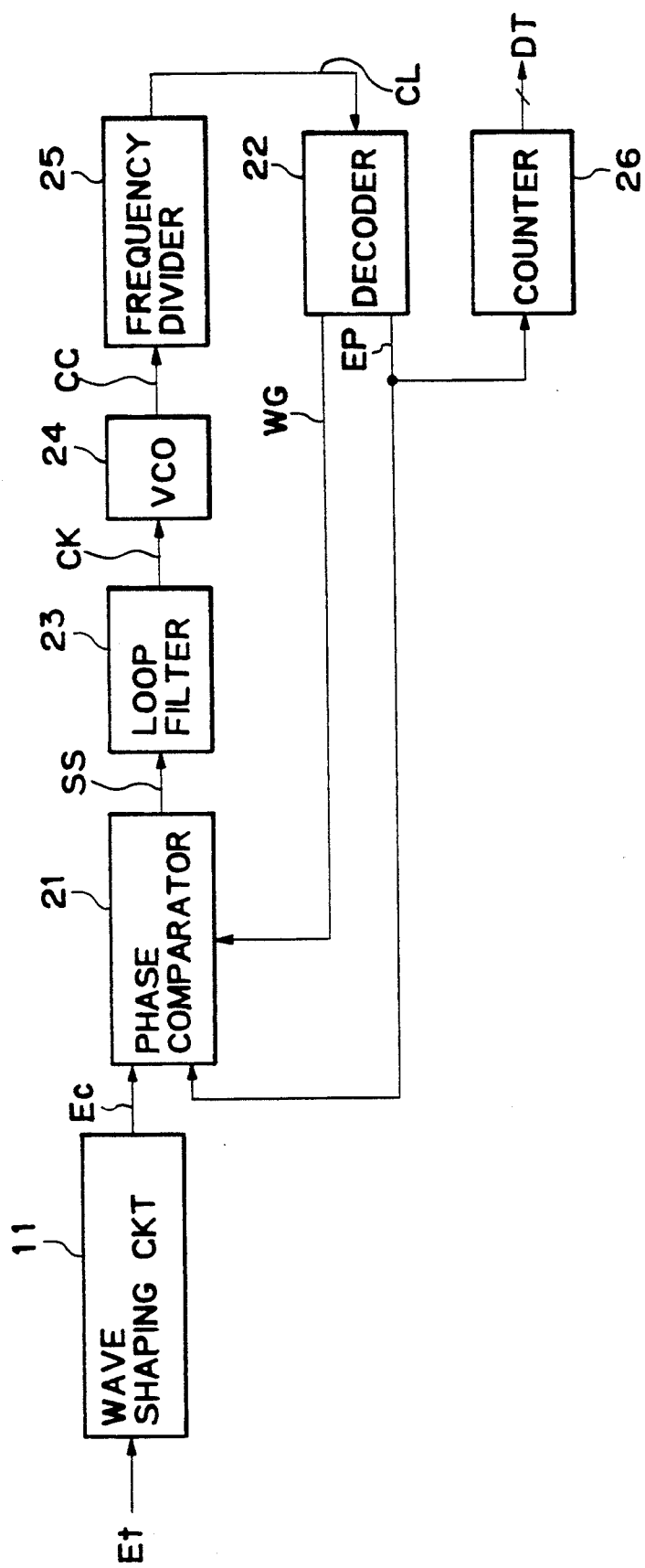
FIG. 5 is a block diagram to show another embodiment of the track counting device according to the present invention.

FIG. 5 shows another embodiment of the track counting device according to the present invention. The same elements and corresponding elements in FIG. 1 are denoted by the same referential numerals in FIG. 5.

Figure 6:
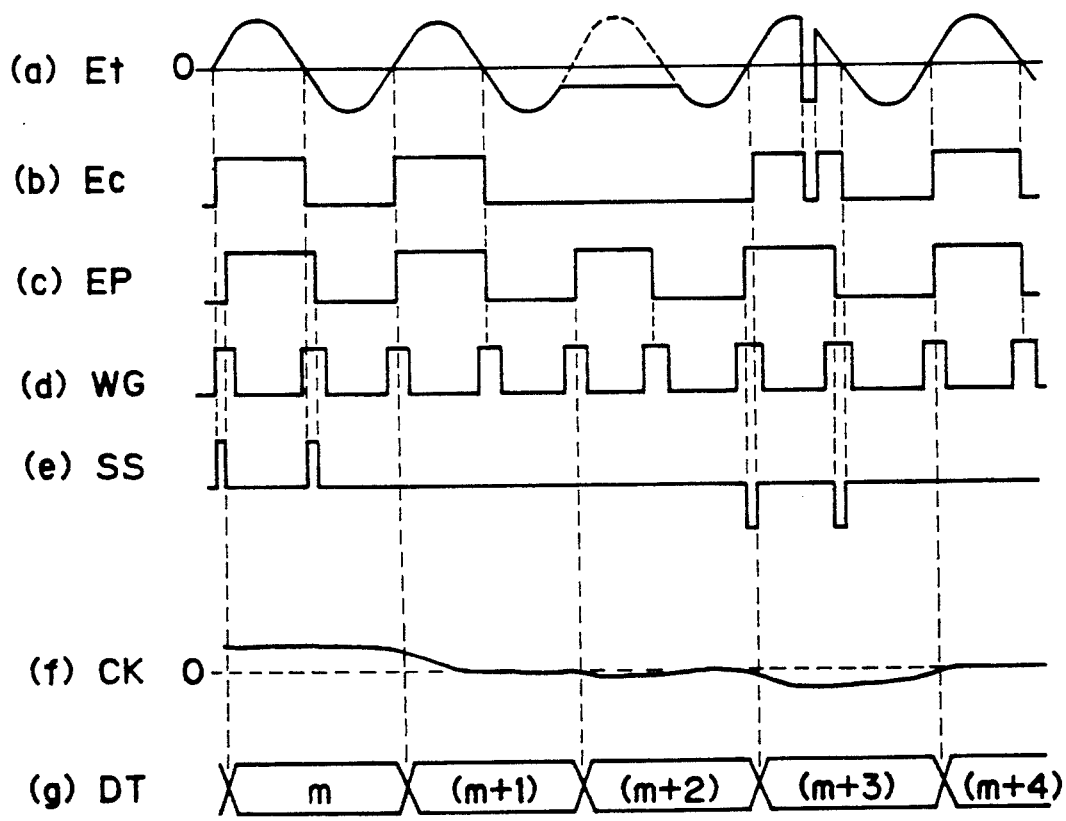
FIG. 6 is a drawing to illustrate operating wave shapes in the device as shown in FIG. 5.

In FIG. 5 a tracking error signal Et (cf. (a) in FIG. 6) output from an unrepresented light pickup element is shaped by a wave shaping circuit 11 with respect to the zero level, and the thus obtained signal Ec (cf. (b) in FIG. 6) is supplied to an input terminal of a phase comparator 21.

The other input terminal of the phase comparator 21 receives a signal EP (cf. (c) in FIG. 6) output by a decoder 22. The phase comparator 21 compares rise edges of signals Ec and EP to judge whether the phase of the signal EP leads or lags that of the signal Ec. The comparator 21 outputs a positive phase comparison signal SS when judging a lagged phase whereas a negative signal SS when a leading phase (cf. (e) in FIG. 6). The phase comparison signal SS is sent to a loop filter 23 given a predetermined loop factor.

The loop filter 23 effects smoothing of the phase comparison signal SS, an output signal of which is led as a control signal CK (cf. (f) in FIG. 6) to a voltage control oscillator (VCO) 24.

The voltage control oscillator 24 generates a clock CC of a frequency corresponding to a level of the control signal CK.

The clock CC is divided with respect to the frequency by a frequency divider 25 in which a predetermined ratio of frequency division is set. A clock CL output from the frequency 25 is supplied to the decoder 22.

The decoder 22 produces a gate signal WG (cf. (d) in FIG. 6) in a similar manner as the decoder 15 in FIG. 1 and a signal EP (cf. (c) in FIG. 6) of rectangular pulses with a period of a recording track. The gate signal WG is supplied to the phase comparator 21, and the signal EP to a counter 26 as well as to the phase comparator 21. The counter 26 counts the number of rise edges in the signal EP to output the count value to a downward element as a crossed track number data DT.

The phase comparator 21, the loop filter 23, the voltage control oscillator 24, the frequency divider 25, and the decoder constitute an analog phase-locked loop circuit.

In the above-described arrangement, the gate signal WG takes the logic level H while the light pickup element moves within a certain distance before and after a recording track, e.g., m, so that the phase comparator 21 may judge the phase relation between the signals Ec and EP thereby.

If the signal EP lags the signal Ec at m, the phase comparator 21 outputs the positive phase comparison signal SS. Then the control signal CK output from the loop filter 23 is increased by a change proportional to the phase comparison signal SS, as seen in (f) of FIG. 6.

By this, the oscillation frequency of the voltage control oscillator 24 increases corresponding to the increase of the phase comparison signal SS, so that the output signal EP from the decoder 22 is controlled to be synchronized with the signal Ec in phase.

On the other hand, if the signal EP leads the signal Ec, for example, when the light pickup element comes to the recording track (m+3), the phase comparator 21 outputs the negative phase comparator signal SS, whereby the control signal CK from the loop filter 23 is reduced corresponding to the change of the phase comparator signal SS, as also seen in (f) of FIG. 6.

This results in reduction is oscillation frequency of the voltage control oscillator 24 corresponding to the decrease of the phase comparison signal SS, whereby the output signal EP from the decoder 22 is controlled to be synchronized with the signal Ec in phase.

As the signal EP output from the decoder 22 is phase-locked with the signal Ec as explained, the count number of the crossed track number data DT output from the counter 26 is always equal to the number of recording tracks actually crossed by the light pickup element.

Further in case that the laser beam of the light pickup element passes a mirror finished surface between the header information recorded area and the user's data area, for instance, at the recording track (m+2), whereby no rise of the signal Ec being appeared without change in the tracking error signal Et, the comparator 21 carries out no comparison to keep the zero level of the output signal SS.

The control signal CK output from the loop filter 23 is maintained, and then the oscillation frequency of the voltage control oscillator 24 is also maintained, so that the crossed track number data DT changes approximately at the same timing when the light pickup element crosses the recording track (m+2). The exact number of recording tracks actually crossed by the light pickup element may be obtained from the crossed track data DT accordingly.

Also, when the laser beam of the light pickup element crosses a record pit in the user's data area, causing a noise on the tracking error signal Et to undesirably rise the signal Ec, the comparator 21 executes no comparison without the logic level H of the gate signal WG. Thus there is no influence caused by the pit on the counting of the counter 26, which assures the accurate counting.

The present embodiment also assures to provide the proper crossed track data DT during the change in speed of the light pickup element from the stationary state to the moving state, and vice versa, similarly as in the first embodiment.

There are two embodiments above explained where the present invention is applied to the direct read after write optical disk. It should, however, be noted that the present invention is also suitably applicable to other optical disk apparatus using a record medium provided with guide grooves for tracking recording tracks.

As detailed above, the track counting device according to the present invention attains the exact counting of recording tracks actually crossed by the light pickup element apart from influence of surface conditions of the record medium over which the laser beam from the light pickup element crosses, by using the phase-locked signal for the counting instead of the tracking error signal itself actually detected.

Many widely different embodiments of the present invention may be constructed without departing from the spirit and scope of the present invention. It should be understood that the present invention is not limited to the specific embodiments described in the specification, except as defined in the appended claims.

What is claimed is:

1. A track counting device for counting the number of tracks of an optical disk which a light pickup traverses and for detecting a speed of said light pickup based on a tracking error signal output from said light pickup, comprising:
   waveform shaping means for shaping a waveform of said tracking error signal output from said light pickup into a shaped track error signal;
   a digital integrator;
   a phase comparator comparing the difference in phase between said shaped track error signal and a predetermined bit of an output of said digital integrator to thereby output difference in phase digital data;

means for receiving said difference in phase digital data output by said phase comparator and for producing digital data as moving speed data according to said difference in phase digital data.

said digital integrator integrating said digital data as moving speed data to thereby output the integrated digital data as said number of tracks; and a decoder for decoding a plurality of bits of said output of said digital integrator to thereby generate a gate signal indicating a near changing edge of said predetermined bit, and for enabling said phase comparator only when said gate signal indicates a near changing edge of said predetermined bit.

* * * * *